(12) United States Patent
Waclawsky et al.

(10) Patent No.: US 7,072,343 B1
(45) Date of Patent: Jul. 4, 2006

(54) METHODS AND APPARATUS FOR CONTROLLING A DATA STREAM USING A HOST AGENT ACTING ON BEHALF OF A HOST COMPUTER

(75) Inventors: John G. Waclawsky, Fredrick, MD (US); Hamesh Chawla, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/405,777

(22) Filed: Sep. 27, 1999

(51) Int. Cl.
H04L 12/28 (2006.01)

(52) U.S. Cl. .................. 370/395.21; 370/235; 709/202; 709/223

(58) Field of Classification Search ................ 370/235, 370/236, 431, 432, 464; 709/200–203, 208–211, 709/223, 225–232, 310, 313, 317
See application file for complete search history.

(56) References Cited

U.S. PATENT DOCUMENTS

| 5,930,473 | A | * | 7/1999 | Teng et al. ................. 709/204 |
| 5,944,783 | A | * | 8/1999 | Nieten ......................... 709/202 |
| 6,014,694 | A | * | 1/2000 | Aharoni et al. ............. 370/232 |
| 6,094,672 | A | * | 7/2000 | Willie et al. ................ 709/202 |
| 6,101,549 | A | * | 8/2000 | Baugher et al. ............ 709/238 |
| 6,170,005 | B1 | | 1/2001 | Meandzija ................... 709/217 |
| 6,185,555 | B1 | | 2/2001 | Sprenger et al. ............... 707/3 |
| 6,185,598 | B1 | | 2/2001 | Farber et al. ............... 709/200 |
| 6,404,746 | B1 | * | 6/2002 | Cave et al. ................. 370/262 |

* cited by examiner

*Primary Examiner*—Hassan Kizou
*Assistant Examiner*—David E. Odland
(74) *Attorney, Agent, or Firm*—Chapin & Huang, L.L.C.; David E. Huang, Esq.

(57) ABSTRACT

Techniques are provided for controlling a data stream without communicating with a host generating the data stream. A host agent (associated with the host generating the data stream) runs in a computerized data processing device and receives a request signal from a request signal source (e.g., a router seeking direction on how to handle the data stream). In response to the request signal, the host agent generates a control signal which includes the control information for controlling the manner in which the request signal source transfers the data stream.

18 Claims, 7 Drawing Sheets

ARRANGEMENT IN WHICH AGENT ACTS ON BEHALF OF SENDING HOST

METHODS AND APPARATUS FOR CONTROLLING A DATA STREAM USING A HOST AGENT ACTING ON BEHALF OF A HOST COMPUTER

BACKGROUND OF THE INVENTION

A typical data communications network includes multiple host computers (or hosts) that communicate with each other through a system of data communications devices (e.g., switches and routers) and transmission media (e.g., electrical wiring, fiber-optic cable, and/or wireless connections). In general, a sending host exchanges data with a receiving host by packaging the data using a standard format or protocol to form one or more data structures (e.g., packets, frames or cells), and transferring these data structures (hereinafter generally referred to as packets) to the receiving host through the above-described system of data communications devices and transmission media. The receiving host then unpackages and uses the data.

A data stream refers to one or more packets sent by a sending host to a receiving host. The data communications devices (also called nodes), which reside between sending and receiving hosts, provide network paths that convey such data streams from the sending hosts to the receiving hosts.

Some nodes are configured to directly communicate with a sending host or a receiving host when transferring a data stream from the sending host to the receiving host. In particular, such nodes often require control information from the sending or receiving host for controlling the data stream. For example, when a sending host provides an ReSerVation Protocol (RSVP) session (i.e., a data stream) to a receiving host through a particular node, an RSVP daemon running on that node typically receives, from the sending host, instructions that direct the RSVP daemon to reserve a particular amount of bandwidth on behalf of the sending host for the RSVP session. As another example, when a data stream reaches a particular node that filters packets for security purposes (e.g., a firewall or security node), that filtering node may communicate with the sending or receiving host for information to authenticate the data stream prior to allowing the data stream to pass through to the receiving host.

SUMMARY OF THE INVENTION

In conventional network arrangements, it is common for nodes (i.e., data communications devices such as routers, switches or bridges) to communicate with sending and receiving hosts to obtain guidance or direction on how to handle data streams destined from the sending hosts to the receiving hosts. Unfortunately, such communications between the nodes and hosts provide certain drawbacks.

For example, such communications generate network traffic that can interfere with the data streams. In one arrangement, a node along a highly congested path leading from a sending host to a receiving host may attempt to communicate with a sending or receiving host prior to dropping packets of a data stream from the sending host to the receiving host. By way of example, the node may ask the sending or receiving host for permission to drop packets of the data stream. The packets generated for this additional communication may only serve to further congest the network path leading from the node to the sending or receiving host.

As another example, suppose that a particular node acts as a firewall (for security purposes) by only permitting certain types of packets to pass from one network area to another. When the particular node encounters a data stream having packets that do not have immediate approval to pass from one network area to the other, the particular node may temporarily buffer the packets of that type until it can communicate with a particular host to obtain approval (e.g., authentication). Such buffering will delay transfer of the buffered packets and perhaps consume substantial memory resources at the buffering, firewall node. Furthermore, communications between this node and the host may consume significant host resources (e.g., to authenticate the data stream and provide direction to the firewall node) that could otherwise be used for other operations (e.g., transmitting other data streams, or receiving and processing other data streams).

Yet another drawback of conventional data communications mechanisms that require communication between a host and a node is that the host must require intimate knowledge of the protocol(s) used to carry out the communications. For example, in the context of RSVP, the sending and/or receiving host(s) that must communicate with a node to reserve bandwidth for a particular data stream using RSVP must be specifically equipped with the full set of RSVP logic instructions to correctly implement the RSVP protocol. This host-based protocol knowledge that is required in prior art systems may be quite complex and is generally very protocol-specific. As such, as protocols such as RSVP, security protocols, or other host-node protocols evolve over time, quite often, each host on a network must be re-equipped with the newest versions of the protocol in order to be able to properly communicate with the nodes that use the protocols. This requirement creates the need to frequently update software on each host in the network with newer and newer versions of protocols, which can be quite a time-consuming task in and of itself.

In contrast to conventional mechanisms that require communications between a node and a host (i.e., a sending host or a receiving host) when a data stream transfer mechanism of that node requires guidance or direction, the present invention is directed to techniques for controlling a data stream based on control information provided by a host agent acting on behalf of the host. In one arrangement, the host agent operates within the node itself. In another arrangement, the host agent runs in a device (another node or another host) that is different than the host on whose behalf the host agent operates. Both arrangements save host resources, and do not increase congestion in the network path that fully extends between the node seeking the control information and the host.

In one embodiment, a host agent runs in a computerized data processing mechanism and receives a request signal from a request signal source (e.g., a node). The request signal requests, from a host computer that is different than the computerized data processing mechanism, control information for controlling a manner in which the request signal source transfers a data stream. In response to the request signal, the host agent generates a control signal which includes the control information for controlling the manner in which the request signal source transfers the data stream. The host agent provides the control signal to the request signal source to individually control the manner in which the request signal source transfers the data stream among multiple data streams transferred by the request signal source. Since the host computer is not needed to provide the control information, resources of the host computer are left available for other operations and bandwidth between the host computer and the request signal source is conserved.

In one arrangement, the host agent acts on behalf of a sending host or an originator of the data stream. In another arrangement, the host agent acts on behalf of a receiving host or an intended recipient of the data stream.

Preferably, the computerized data processing mechanism forms the control signal without communicating with the host computer in response to the request signal, and the computerized data processing mechanism and the request signal source reside in the same apparatus, e.g., they form at least part of the same data communications device. In such an arrangement, the request and control signals do not to pass through the network. Rather, the signals are contained within a single structure, e.g., as multiple processes that (i) run within the same device or cabinet, and (ii) use Interprocess Communications (IPC) mechanisms to exchange request and control signals. In such an arrangement, for the communication between the computerized data processing mechanism and the request signal source, there is no additional network traffic or congestion generated outside the apparatus.

In one arrangement, the data stream is a ReSerVation Protocol session. In this arrangement, the control information of the control signal includes ReSerVation Protocol instructions. For example, the host agent directs the request signal source (e.g., a router) to establish and maintain a particular RSVP data stream between an RSVP sending host and an RSVP receiving host, thus avoiding the need for extensive communication between the request signal source and the sending or receiving host when establishing the RSVP session.

By way of example, the RSVP communication used to reserve a path for a data stream may take place between the host agent executing within a router and the router itself. In this situation, the host does even not need to be equipped with RSVP. That is, the burden of performing complex RSVP operations is offloaded onto a data communications device within the network rather than placed upon the host. As such, the need for the host to have intimate knowledge of how to properly manipulate data arranged in compliance with a particular standard or protocol (e.g., RSVP) is largely eliminated.

In another arrangement, the data stream is a multicast session. In this arrangement, the control information of the control signal includes Internet Group Messaging Protocol (IGMP) instructions. For example, the host agent directs the request signal source to join a multicast group in order to obtain a particular multicast data stream on behalf of a particular receiving host without extensive communication (e.g., IGMP exchanges) between the host and the node at the time the receiving host requests the multicast data stream.

Preferably, the host agent has the capability to perform an operation that decides whether to contact the host computer for assistance in response to the request signal. If the result indicates that such contact is unnecessary, the operation then simply directs the data communications device not to contact the host computer in response to the request signal.

Another embodiment of the invention is directed to a computer program product that includes a computer readable medium having instructions stored thereon for controlling a data stream. The instructions, when processed by a data communications device, cause the data communications device to receive a request signal from a request signal source. The request signal requests, from a host computer that is different than the data communications device, control information for controlling a manner in which the request signal source transfers the data stream. The instructions further cause the data communications device to generate a control signal in response to the request signal. The control signal includes the control information for controlling the manner in which the request signal source transfers the data stream. Furthermore, the instructions cause the data communications device to provide the control signal to the request signal source to individually control the manner in which the request signal source transfers the data stream among multiple data streams transferred by the request signal source.

Preferably, the request signal source is a data communications mechanism operating within the data communications device. In this arrangement, the computer readable medium preferably further includes instructions stored thereon for directing operation of the request signal source. For example, the computer readable medium may store the Cisco IOS manufactured by Cisco Systems, Inc. of San Jose, Calif., and the instructions for controlling the data stream (e.g., host agent instructions) may be bundled with the Cisco IOS.

The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention is directed to techniques for controlling a data stream in a data communications device using a host agent which acts on behalf of a host computer. The host agent provides control information in a control signal in response to a request signal sent from the data communications device to a host computer. The data communications device uses the control information to individually control a data stream among multiple data streams. Accordingly, communication from the host computer to the data communications device in response to the request signal is unnecessary thus saving host computer resources and minimizing network traffic. Such techniques may be employed in data communications devices and other computerized devices such as those manufactured by Cisco Systems, Inc. of San Jose, Calif.

Figure 1:
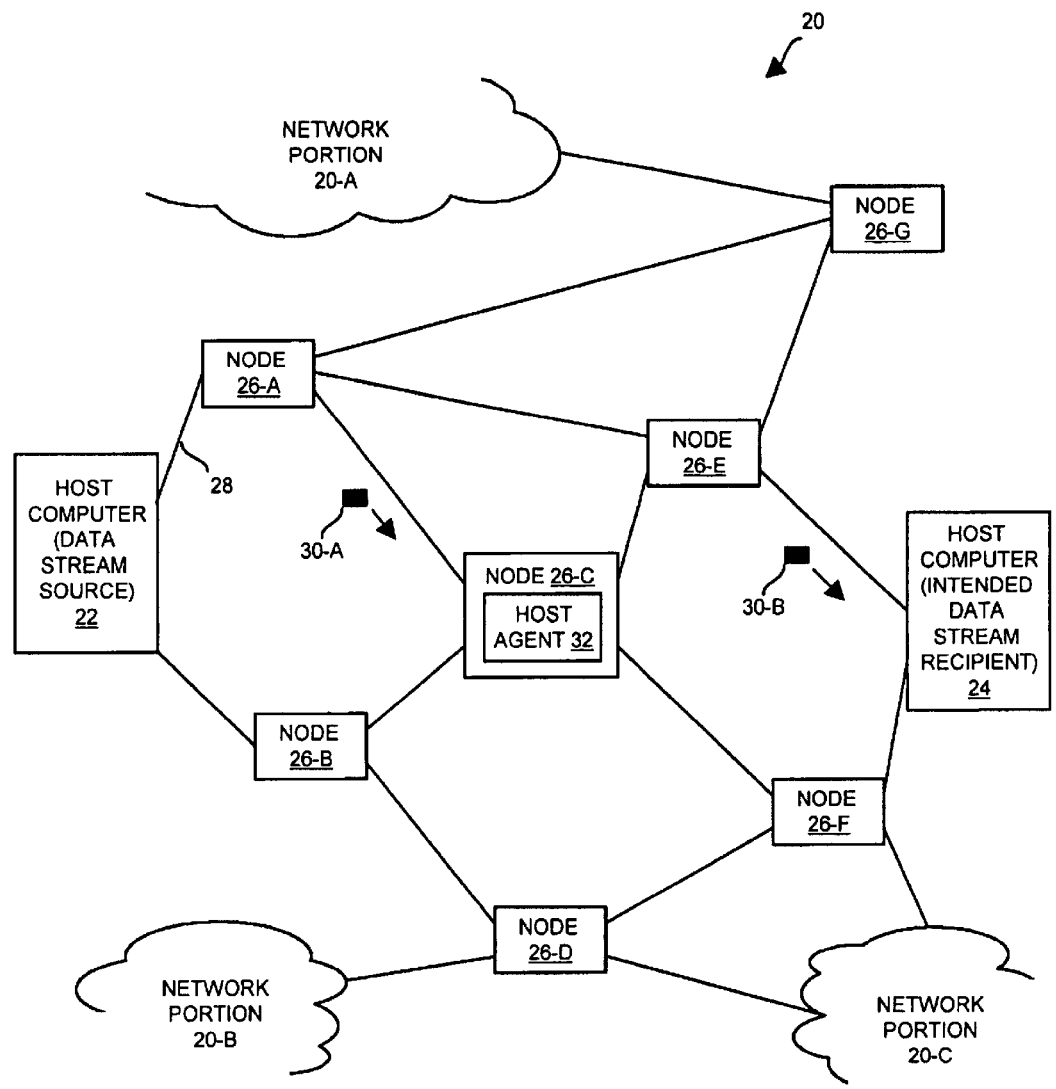
FIG. 1 shows a block diagram of a network having a data communications device which is configured with an agent in accordance with the invention.

FIG. 1 shows a network 20 that is suitable for use by the invention. The network 20 includes a sending host computer 22 (i.e., a data stream source), a receiving host computer 24 (i.e., the intended end-recipient of the data stream), multiple nodes 26 (e.g., routers, switches, bridges, etc.), and a transmission medium 28 (e.g., electrical wire, fiber-optic cable, wireless connections, etc. or any combination thereof). The layout of the network 20 is provided by way of example only, and other configurations are suitable. For example, the layout shown in FIG. 1 may extend to other areas such as network portions 20-A, 20-B and 20-C.

The hosts 22, 24 communicate by exchanging data structures 30 (e.g., packets, frames or cells, and so forth) containing data and header information. The nodes 26 direct these data structures 30 (hereinafter referred to as packets 30 for simplification) through paths within the network 20 based on addresses within their header information. As shown in FIG. 1, packets 30-A and 30-B form a data stream (one or more packets) that flows from the sending host computer 22 (or simply sending host 22) to the receiving host computer 24 (or simply receiving host 24) through nodes 26-A, 26-C and 26-E.

A host agent 32 operates on node 26-C. The host agent 32 acts on behalf of a host computer within the network 20 (e.g., on behalf of the sending host 22 or the receiving host 24). In particular, the host agent 32 can respond to a request signal, from a node (e.g., 26-A, 26-C, 26-E) within the network 20, requesting control information for controlling a data stream (e.g., packet 30) passing through the node (e.g., the node 26-C). Further details of node 26-C will now be provided with reference to FIG. 2.

Figure 2:
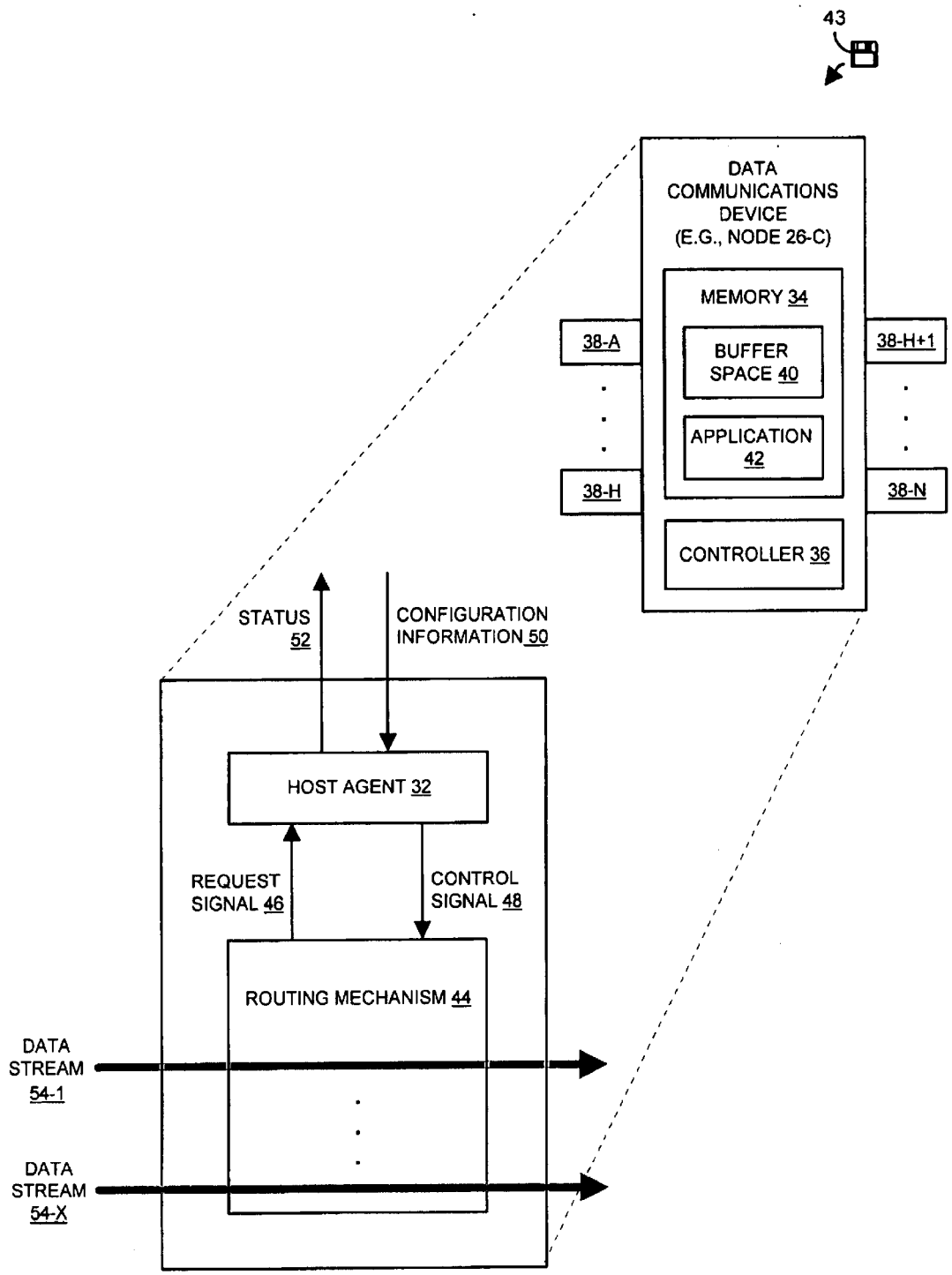
FIG. 2 shows a block diagram of the data communications device of FIG. 1 which is configured with the agent.

As shown in FIG. 2, the node 26-C includes memory 34, a controller 36 (e.g., a processor), and multiple ports 38-A, . . . , 38-N (collectively, ports 38) which receive and send network packets 30. The memory 34 includes buffer space 40 and an application 42. The buffer space 40 temporarily stores packets 30 received from the network 20 prior to transmission of the packets 30 back into the network 20 (e.g., from node 26-A to node 26-E in FIG. 1). The application 42 directs the operation of the data communications device 26-C.

Preferably, the application 42 installs on node 26-C from a computer program product 43. In one arrangement, the computer program product 43 further includes the operating system for node 26-C, i.e., the application 42 is bundled as part of the operating system. For example, the application 42 and the operating system may belong to the Cisco IOS manufactured by Cisco Systems, Inc. of San Jose, Calif. In another arrangement, the application 42 is shipped separately from the operating system. The application may also be provided to node 26-C over the network 20, e.g., through a network download from a network server, etc.

In this example, when the data communications device, node 26-C, operates under direction of the application 42, the circuitry within node 26-C behaves as two components: a routing mechanism 44 and the host agent 32 (see FIGS. 1 and 2). The routing mechanism 44 transfers packets of multiple data streams 54-1, . . . , 54-X (collectively, data streams 54) through the ports 38 of node 26-C. The host agent 32 acts on behalf of a host (e.g., the sending host 22 or the receiving host 24 in FIG. 1) to provide control information to the routing mechanism 44 to enable the routing mechanism 44 to manipulate one or more of the data streams 54 on an individual basis. By way of example, the host agent 32 provides control information which enables the routing mechanism 44 to manipulate data stream 54-1 differently than data stream 54-X, which may be associated with another host.

Further details of the communication between the routing mechanism 44 and the host agent 32 will be provided with reference to the following example. Suppose that the routing mechanism 44 determines that it needs to begin dropping packets due to network congestion at its ports 38 making it difficult to maintain certain transmission rates for the data streams 54. The routing mechanism 44 may attempt to drop packets of data stream 54-1. However, suppose that the routing mechanism 44 is configured by the application 42 to first obtain permission from the originator of the data stream 54-1, e.g., the sending host 22.

For a different type of routing device, a routing circuit of the routing device would need to communicate with a sending host by sending a request signal (in the form of one or more packets 30) requesting control information (permission to drop packets or denial of its request) from that sending host. That sending host would then need to receive the request signal, process the request signal to generate a control signal containing permission to drop packets or denying permission), and send the control signal back to the routing circuit. Such communications places the burden of responding to the request signal directly on the sending host, and forces the routing circuit to wait for an answer as the communications (request and control signals) propagate from the routing device to the sending host and then back to the routing device through the network. Such a routing device is described in U.S. patent application Ser. No. 09/340,524, filed Jun. 28, 1999, entitled "Methods and Apparatus for Managing a Flow of Packets Using Change and Reply Signals," the teachings of which are hereby incorporated by reference in their entirety.

In contrast to the conventional case, the routing mechanism 44 of node 26-C provides a request signal 46 requesting control information indicating whether the routing mechanism 44 can begin dropping packets 30 of the data stream 54-1, and the request signal is received by the host agent 32 which also runs on node 26-C. In particular, on behalf of the sending host 22, the host agent 32 receives the request signal 46 from the routing mechanism 44, generates a control signal 48 in response to the request signal 46, and provides the control signal 46 back to the routing mechanism 44. The routing mechanism 44 then individually controls the manner in which it transfers the data stream 54-1 (associated with the sending host 22) among the multiple data streams 54 based on the control information (e.g., begins to drop packets 30 of the data stream 54-1 or does not drop such packets 30).

Preferably, the host agent 32 has the capability to communicate with the sending host 22 but such communications can be made in a less urgent or bandwidth-consuming manner than having to reply to the request signal 46 from the routing mechanism 44. In particular, prior to instances of high congestion or heavy processing, the host agent 32 can receive configuration information 50 (e.g., guidelines indicating conditions when dropping packets from the sending host 22 is unacceptable) from the sending host 22 and provide status information 52 (e.g., warnings when packet dropping occurs and confirmations) to the sending host 22. In other words, the host can be pre-programmed by the host or other device to operate in certain ways upon the occurrence of certain events or conditions. In addition, the host agent 32 can communicate with the sending host 22 or the receiving host 24 using any communication method that these hosts 22, 24 understand without having to force them to communicate using RSVP or other protocol.

Figure 3:
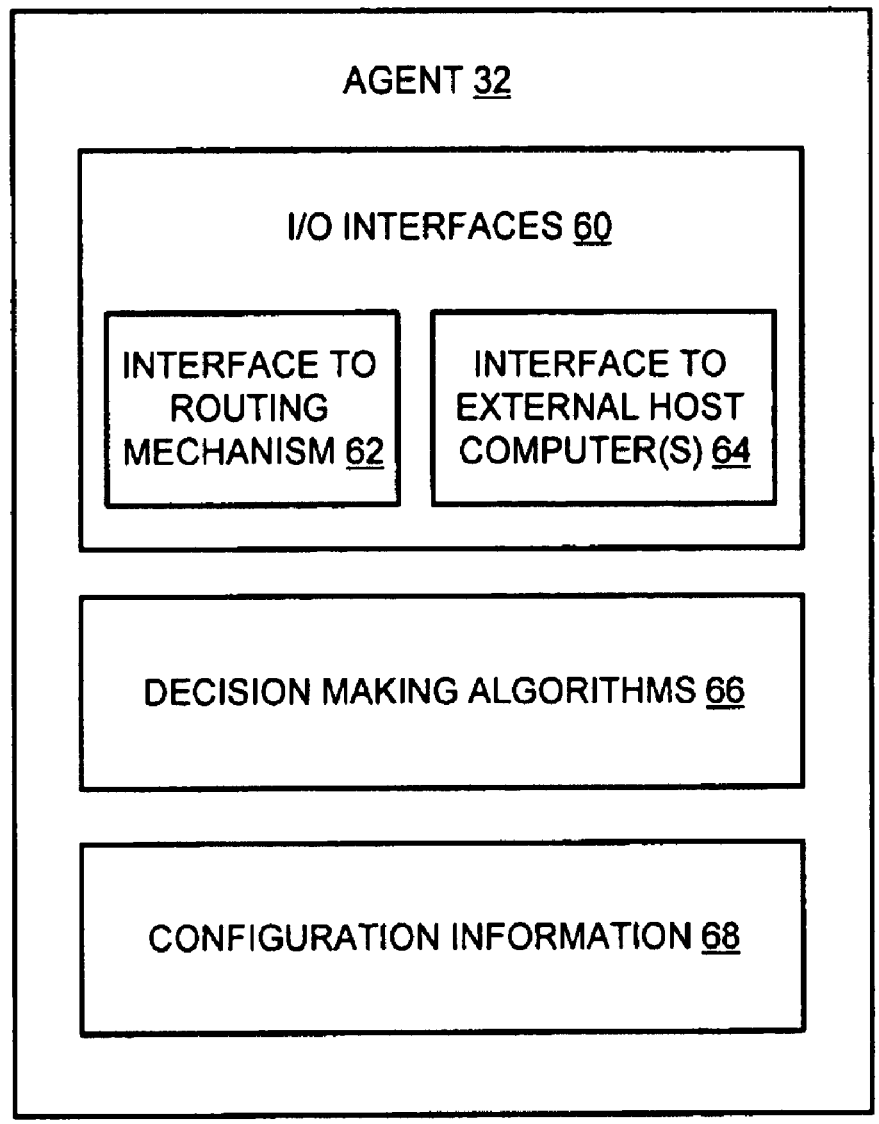
FIG. 3 shows a detailed block diagram of the agent of FIGS. 1 and 2.

Further details of a preferred host agent 32 that is suitable for use by the invention are shown in FIG. 3. The host agent 32 preferably includes an input/output (I/O) interface 60 having an interface 62 to the routing mechanism 44, and another interface 64 to an external host computer (e.g., the sending host 22). Preferably, the routing mechanism 44 includes one or more computer process components, and the host agent 32 runs as a process on the data communications device such that the interface 62 to the routing mechanism 44 includes an Interprocess Communications (IPC) interface. In contrast, the interface 64 to the external host computer preferably implements a standard network protocol (e.g., ATM, IP, token ring, etc.).

In one arrangement, the request and control signals 46, 48 which are exchanged between the host agent 32 and the routing mechanism 44 are non-network interface, IPC signals. In this arrangement, when the routing mechanism 44 generates a request for control information from a host computer (e.g., host computer 22), the host agent 32 intercepts and responds to the request so that the host computer never receives the request. Accordingly, the host computer is not burdened with the task of having to reply to the request.

The host agent 32 shown in FIG. 3 further includes one or more decision making algorithms 66. In conventional arrangements, such algorithms (e.g., policies to determine whether to allow packet drops for an individual data stream) run on the host computer (i.e., the sending or receiving host). However, for the invention, such algorithms reside in the host agent 32. These algorithms may implement complex policies such as sophisticated packet drop policies, simple rules such as drop-enable or drop-disable commands, or a combination thereof. In any case, the host computer is not burdened with having to compute results for such algorithms. Rather, the overhead is offloaded onto network devices (e.g., node 26-C) via the host agent 32.

Furthermore, the burden of complying and handling protocols (e.g., RSVP, IGMP, or any other protocol typically carried-out between a host and a node) can be offloaded to the host agent 32. As a result, the sending and/or receiving hosts are not required to have knowledge about how to implement the protocols.

Additionally, the host agent 32 shown in FIG. 3 includes configuration information 68, i.e., input parameters to the decision making algorithms 66. In one arrangement, the configuration information 68 is provided to the host agent 32 by the host computer (e.g., host 22) at some time prior to the time when the node 26-C handles the data stream 54-1. In another arrangement, the configuration information is provided by a source other than the host computer, e.g., a network administrator of node 26-C during a network administration phase of maintaining the network 20. In either arrangement, the configuration information 68 is not provided to the host agent 32 in, response to the request signal 46. Rather, the configuration information 68 is acquired by the host agent 32 in anticipation that it will be needed sometime in the future by the host agent 32 to alleviate the need for communication between the host agent 32 and the host computer 22 or 24 in response to the request signal 46.

By way of example, the configuration information 68 includes a schedule which instructs the host agent 32 how to operate at different times of the day to accommodate different patterns of network traffic. For example, the configuration information can direct the host agent 32 to operate according to a first set of algorithms making it less likely for the host agent 32 to provide permission (on behalf of the host) to drop packets to the routing mechanism 44 during one particular time period or for one particular data stream relative to other time frames or other data streams. Additionally, the configuration information 68 preferably includes authentication information enabling the host agent 32 to authenticate communications (e.g., commands and instructions) that will be received from the host computer in the future.

Figure 4:
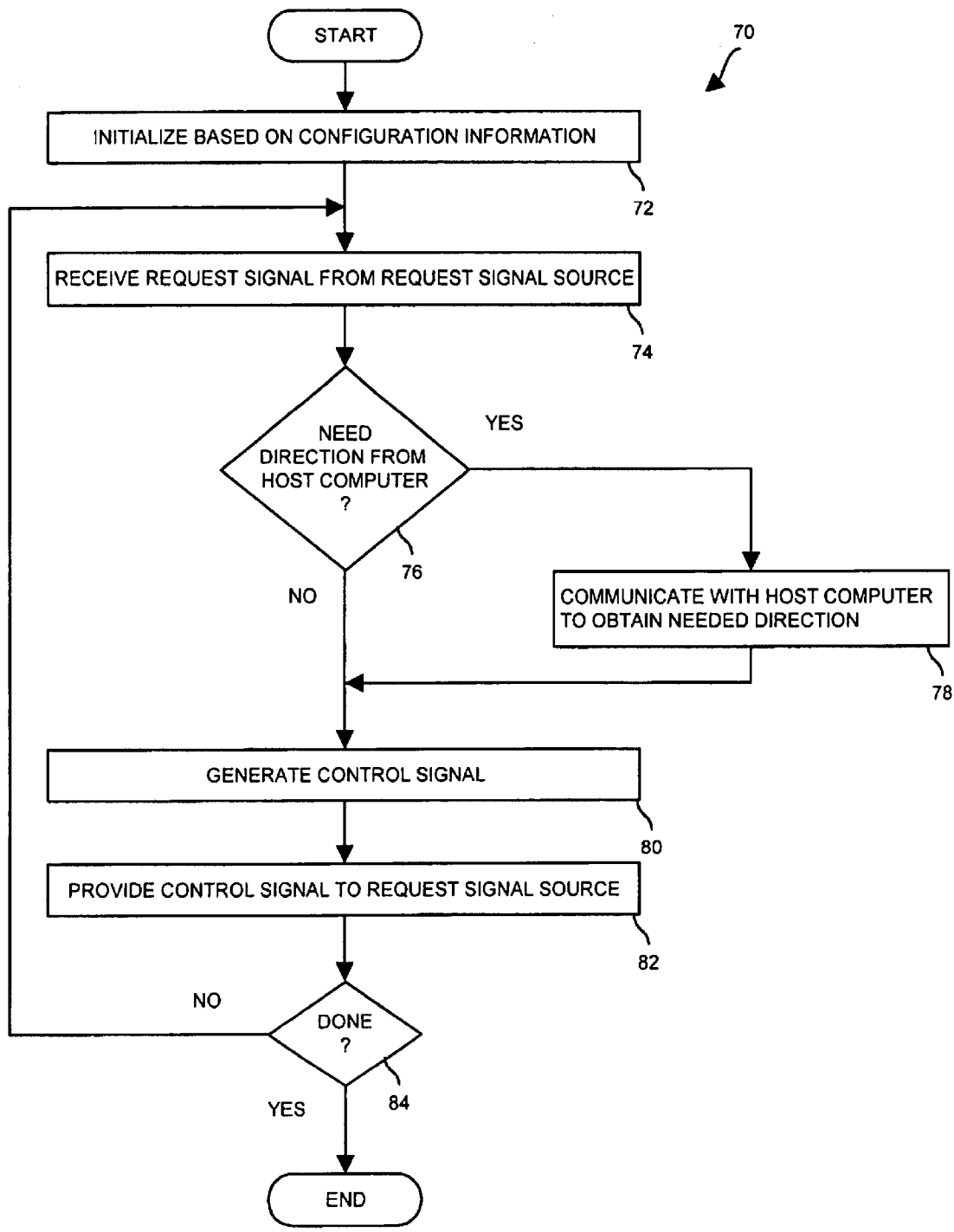
FIG. 4 shows a flow diagram of a procedure performed by the agent of FIG. 3.

Further details of the operation of the host agent 32 will now be provided with reference to the flow chart of FIG. 4. The host agent 32 performs a procedure 70. In particular, in step 72, the host agent 32 initializes (e.g., starts up as a process) on node 26-C in accordance with the configuration information 68. The host agent 32 is now up and running, and is capable of acting on behalf of a host computer. In particular, the host agent 32 is configured to respond to request signals 46 requesting control information for controlling individual data streams. Preferably, the host agent 32 and routing mechanism 44 are configured to communicate via non-networking techniques such as IPC mechanisms (e.g., semaphores, shared memory, etc.). In the alternative, the routing mechanism 44 is configured to generate the request signal 46 in a standard format (e.g., as packets 30) in a manner similar to that for communicating with a host computer, and the host agent 32 is configured to intercept the request signal 46 (e.g., based on packet destination addresses) prior to its transmission out one of the ports 38.

In step 74, the host agent 32 receives a request signal 46 (also see FIG. 2) from a request signal source, i.e., the routing mechanism 44. The request signal 46 seeks control information from the host computer as to how to manipulate an individual data stream 54 handled by the routing mechanism 44.

In step 76, the host agent 32 determines whether it needs direction from the host computer. That is, the host agent 32 determines whether it has enough information to provide the requested control information without contacting the host computer. If not, in step 78 the host agent 32 communicates with the host computer (e.g., data stream source 22 or data stream recipient 24 in FIG. 1) to obtain the needed information before proceeding to step 80. If so (i.e., if the host agent 32 has enough information to proceed without contacting the host), the host agent 32 proceeds directly to step 80.

In step 80, the host agent 32 generates the control signal 48 (see FIG. 2) using the decision making algorithms 66 and the configuration information 68. The control signal 48 includes control information for individually controlling the manner in which the request signal source, routing mechanism 44, transfers the data stream 54.

In step 82, the host agent 32 provides the control signal 48 to the request signal source (routing mechanism 44). In response to the control signal 48, the request signal source extracts the control information and individually manipulates a data stream 54.

In step 84, the host agent 32 determines whether it should continue. If the host agent 32 receives instructions to stop (e.g., in response to a shutdown message), the host agent 32 terminates operation. Otherwise, the host agent 32 loops back to handle another request signal 46 should the request signal source provide another one. That is, the procedure 70 loops back to obtain further direction for handling the same data stream 54, or new direction for handling another data stream 54 relating to the host computer on whose behalf the host agent 32 operates.

Figure 5:
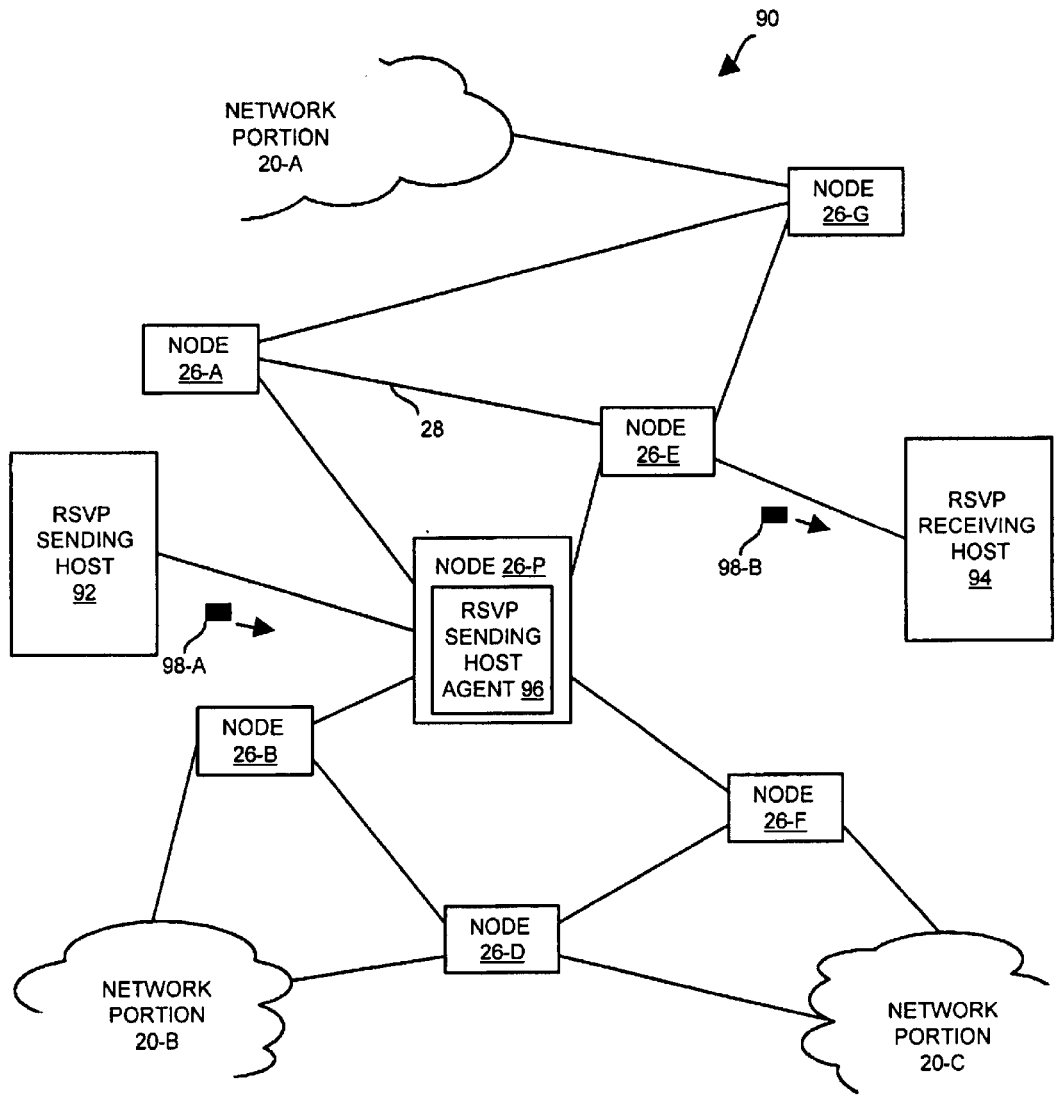
FIG. 5 shows a block diagram of a network arrangement having a data communications device which is configured with an agent that acts on behalf of a sending host.

By way of example only, FIG. 5 shows an arrangement in which a host agent operates on behalf of a sending host. In this example, a network 90 includes a sending host 92 and a receiving host 94. Node 26-P includes a host agent 96 which acts on behalf of the sending host 92. Further, suppose that the sending host 92 provides a data stream for use in an RSVP session, i.e., a data stream 98 formed by packets 98-A and 98-B, through node 26-P to a host computer somewhere else in the network 90 (e.g., in network portion 20-A).

If the receiving host 94 wishes to tap into the RSVP session, the receiving host 94 sends a request upstream to the sending host 92, through node 26-E and node 26-P. When the request reaches node 26-P, node 26-P does not need to send a request (a request signal) to the sending host 92 looking for approval from the sending host 92 to provide the RSVP session to the receiving host 94. Rather, the host agent 96 acts on behalf of the sending host 92 to grant or disallow such a tap-in. In particular, the host agent 96 runs its algorithms 66 and references its configuration information 68 (see FIG. 3) to determine whether node 26-P should commit bandwidth to sending the data stream 98 to the receiving host 94, and whether the receiving host 94 is an authorized recipient. Regardless of the host agent's decision, such operation is without any communication with the sending host 92 in response to the receiving host's request. Accordingly, network traffic is reduced and resources at the sending host 92 are conserved.

Figure 6:
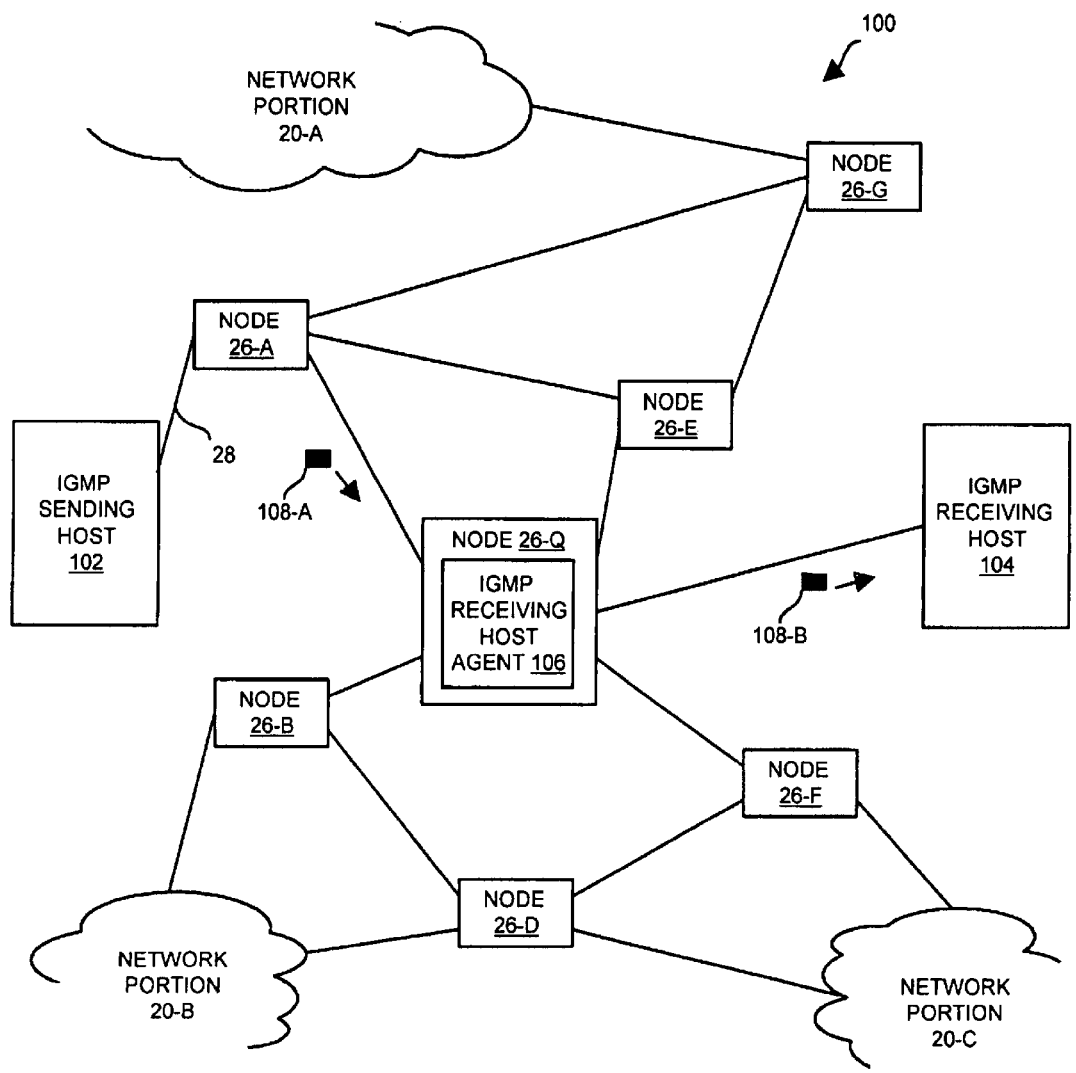
FIG. 6 shows a block diagram of a network arrangement having a data communications device which is configured with an agent that acts on behalf of a receiving host.

As another example, FIG. 6 shows an arrangement in which a host agent operates on behalf of a receiving host. In this example, a network 100 includes a sending host 102 and a receiving host 104. Node 26-Q includes a host agent 106 which acts on behalf of the receiving host 104. Further, suppose that the sending host 102 is scheduled to provide a multicast session, i.e., a data stream 108 formed by packets 108-A and 108-B, through node 26-Q to a host computer somewhere else in the network 100 (e.g., in network portion 20-B) at a scheduled time.

In a conventional situation, a receiving host tries to tap-into a multicast session handled by a node using IGMP, and that node then exchanges a series of communications with the receiving host to configure the receiving host to properly receive the multicast session at the receiving host (e.g., the node sends a request signal to the receiving host to indicate to a particular application, e.g., a video player, which is capable of rendering the multicast session that the session is now available.

In the invention example, node 26-Q does not need to send a request signal to the receiving host 104 to request that the receiving host 104 is now to run a particular application suitable for receiving the multicast session. Rather, the host agent 106 communicates with the routing mechanism 44 within node 26-Q to properly request the multicast session and generate an output (i.e., the video stream) that is suitable for reception by the receiving host 104 in the receiving host's present state (e.g., without requiring that the receiving host 104 run a specialized application equipped with IGMP). Accordingly, resources at the receiving host are conserved, traffic between node 26-Q and the receiving host 104 is minimized, and the host application need not have specialized knowledge of how IGMP works.

Figure 7:
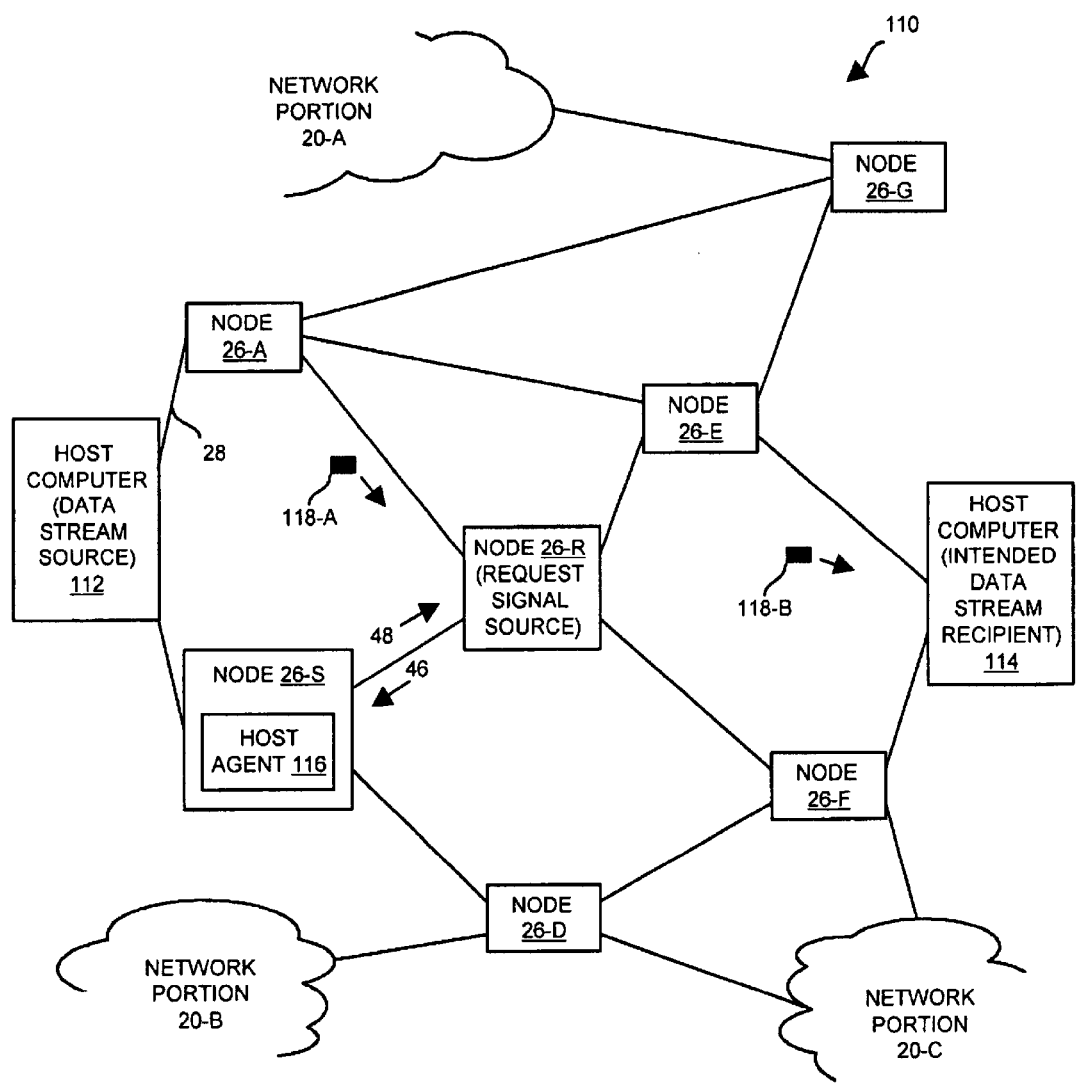
FIG. 7 shows a block diagram of a network arrangement having a first data communications device for transferring a data stream and a second data communications device which is configured with an agent that acts on behalf of a host computer to control the data stream transferred by the first data communications device.

FIG. 7 shows an arrangement in which the host agent operates on a device other than the data communications device having the request signal source. In this arrangement, a network 110 includes a sending host 112 and a receiving host 114. Node 26-R requires control information (e.g., from the receiving host 114) for manipulating a data stream 118 formed by packets 118-A and 18-B. Node 26-S includes a host agent 116 which acts on behalf of a host computer (e.g., the receiving host 114). In this arrangement, the host agent 116 on node 26-S and the host computer (the receiving host 114) have previously agreed that the host agent 116 should respond to request signals from node 26-R. Accordingly, when node 26-R sends a request signal 46 onto the network 110 requesting control information from the host computer, the host agent 116 responds to the request signal 46 by providing a control signal 48, and the host computer ignores the request signal. This avoids having both the host agent 116 and the host computer reply to the same request signal. Thus, resources at the host computer (receiving host 114) are conserved and traffic along the path extending from node 26-R to the host computer is minimized.

In summary, the invention is directed to techniques for controlling a data stream within a data communications device using a host agent that acts on behalf of a host computer. The host agent provides control information in a control signal in response to a request signal provided from the data communications device for a host computer. The data communications device uses the control information to individually control a data stream among multiple data streams. As a result, communication from the host computer to the data communications device in response to the request signal is unnecessary thereby saving host computer resources and minimizing network traffic. Such techniques may be employed in data communications devices and other computerized devices such as those manufactured by Cisco Systems, Inc. of San Jose, Calif.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, the network configurations shown in FIGS. 1, 5, 6 and 7 were provided by way of example only. Other topologies are suitable for use by the invention. As other examples, the invention can be applied to token ring network configurations, Ethernet configurations, and the like.

Additionally, it should be understood that the host agent which acts on behalf of a host computer can be implemented as a singled process or multiple processes. If the host agent is implemented as multiple processes, one or more of these processes can be distributed to other network devices (e.g., other hosts or nodes). Alternatively, the host agent can be implemented as a hardware circuit, e.g., an application specific integrated circuit (ASIC), rather than one or more processes running on a computerized device.

Furthermore, it should be understood that the data structures conveying information and data have been described as packets for simplification only. Other data conveying mechanisms are suitable for use by the inventions such as frames, cells, tokens or any other format which nodes typically use when transferring data between host computers.

Additionally, it should be understood that the request signal can itself be generated in response to a condition, event, or prior request signal. For example, with reference to FIG. 2, the host agent 32 or an external device may communicate with the routing mechanism 44 to configure the routing mechanism 44 to provide the request signal 46 to the host agent 32 upon the occurrence of a particular event or condition (e.g., at a particular time, upon an occurrence of high network traffic, etc.). By way of example, the request signal 46 may be a wake-up signal provided by the routing mechanism 44 at a particular time. In such a situation, the request signal 46 provided by the routing mechanism 44 is itself generated in response to a separate request signal.

What is claimed is:

1. A data communications device comprising:
   multiple network ports;
   memory that stores an application; and
   a controller coupled to the multiple network ports and the memory, an agent process running on the controller when the controller operates in accordance with the application stored in the memory such that the agent:
      intercepts a request signal transmitted from a request signal source to a host computer having a corresponding host destination address, the request signal including the host destination address of the host computer, the request signal originally destined for receipt by the host computer that would respond with control information for controlling a manner in which the request signal source transfers a data stream;
      originates a control signal in response to receiving the request signal, the control signal including the control information for controlling the manner in which the request signal source transfers the data stream; and
      provides the control signal to the request signal source to individually control the manner in which the request signal source transfers the data stream among multiple data streams transferred by the request signal source, wherein the request signal source is a routing mechanism operating within the data communications device.

2. The data communications device of claim 1 wherein the agent forms the control signal without communicating with the host computer in response to request signal when the agent generates the control signal.

3. The data communications device of claim 1 wherein the data stream is a ReSerVation Protocol session, and wherein the control information of the control signal includes ReSerVation Protocol instructions.

4. The data communications device of claim 1 wherein the data stream is a multicast session, and wherein the control information of the control signal includes Internet Group Management Protocol instructions.

5. The data communications device of claim 1 wherein the agent further performs an operation that decides whether to contact the host computer for assistance in response to the request signal, a result of the operation directing the data communications device not to contact the host computer in response to the request signal.

6. The data communications device of claim 1 wherein data within the data stream indicates that the host computer is an originator of the data stream.

7. The data communications device of claim 1 wherein data within the request signal indicates that the host computer is a destined recipient of the request signal.

8. The data communications device of claim 1 wherein the request signal is an interprocess communication signal, and wherein the host agent receives the request signal from the request signal source through an interprocess communication interface of the host agent when acting on behalf of the host computer.

9. A data communications device as in claim 1, wherein the request signal source is disposed at an intermediate node of the network and the request signal source routes the data stream from the host computer to a recipient computer.

10. A data communications device as in claim 1, wherein the controller running the agent process is disposed at an intermediate node of the network other than that of the request signal source.

11. A data communications device as in claim 10, wherein the request signal travels along a path from the request signal source to the controller exclusive of a path associated with the data stream.

12. A computer program product, operating within a data communications device, that includes a computer readable medium having instructions stored thereon for controlling a data stream, such that the instructions, when processed by a controller, cause the controller to perform the steps of:
   intercepting a request signal transmitted from a request signal source to a host computer having a corresponding host destination address, the request signal including the host destination address to support transmission of the request signal to the host computer, the request signal originally destined for the host computer that would otherwise respond with control information for controlling a manner in which the request signal source transfers the data stream;
   originating a control signal in response to intercepting the request signal, the control signal including the control information for controlling the manner in which the request signal source transfers the data stream; and
   providing the control signal to the request signal source to individually control the manner in which the request signal source transfers the data stream among multiple data streams transferred by the request signal source, wherein the request signal source is a routing mechanism operating within the data communications device, and wherein the computer readable medium further includes instructions stored thereon for directing operation of the request signal source.

13. A method for controlling transmission of a data stream through a network, the method comprising:
   at least partially supporting transmission of the data stream from a data stream source to a data stream recipient via a routing mechanism disposed at a network communications device between the data stream source and data stream recipient, the routing mechanism supporting transmission of the data stream based, at least in part, on received control information;
   providing a software agent at the network communications device;
   via the software agent, intercepting a request signal transmitted from the routing mechanism to a remote host computer that, if the request signal was otherwise received by the remote host computer, would respond with control information for controlling a manner in which the routing mechanism transfers the data stream;
   from the software agent intercepting the request signal:
      originating a control signal in response to intercepting the request signal, the control signal including the control information for controlling the manner in which the routing mechanism transfers the data stream; and
      providing the control signal including control information to the routing mechanism to control a manner in which the routing mechanism transfers the data stream from the data stream source to the data stream recipient.

14. A method as in claim 13, wherein intercepting a request signal includes:

intercepting the request signal originally destined for receipt by the remote host computer, the remote host computer being the data stream recipient that receives the data stream.

15. A method as in claim 13, wherein intercepting a request signal includes:

intercepting the request signal originally destined for receipt by the remote host computer, the remote host computer being the data stream source that transmits the data stream.

16. A method as in claim 15, wherein intercepting the request signal includes:

intercepting the request signal which includes a request for permission to drop data packets associated with the data stream, the software agent responding to the request for permission to drop data packets received from the routing mechanism on behalf of and instead of the data stream source.

17. A method as in claim 16 further comprising:

at the software agent, receiving configuration information from the remote host computer indicating when it is acceptable to drop data packets of the data stream; and at the software agent, utilizing the received configuration information from the remote host computer to provide control information to the routing mechanism how to transfer the data stream.

18. A method as in claim 17 further comprising:

in response to the routing mechanism dropping data packets of the data stream, generating and transmitting a message from the software agent to the remote host computer indicating when data packets of the data stream have been dropped.

\* \* \* \* \*